Feb. 6, 1968     G. OBERLÄNDER     3,368,082
INSTANTLY AVAILABLE RESERVE INSTALLATION
FOR ELECTRIC NETWORKS

Filed Jan. 25, 1967     3 Sheets-Sheet 1

Inventor:
Georg Oberländer
By
Walter Becky

Feb. 6, 1968 G. OBERLÄNDER 3,368,082
INSTANTLY AVAILABLE RESERVE INSTALLATION
FOR ELECTRIC NETWORKS
Filed Jan. 25, 1967 3 Sheets-Sheet 3
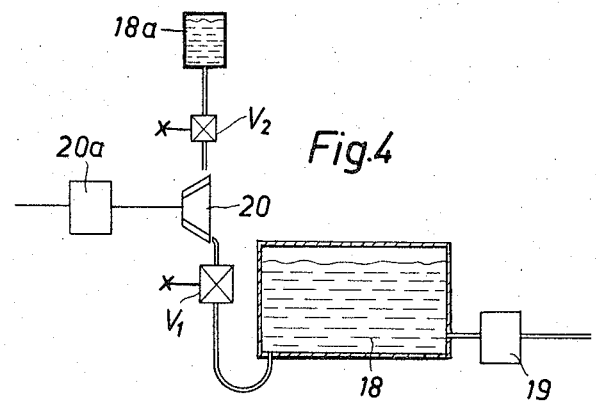
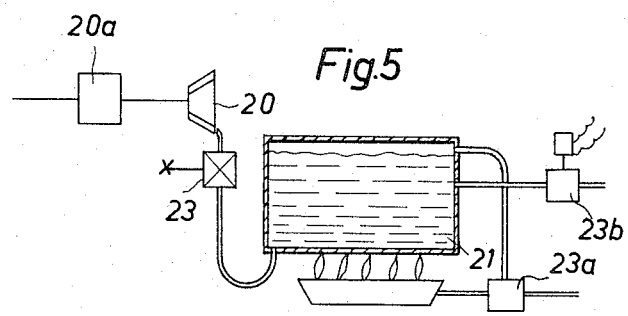
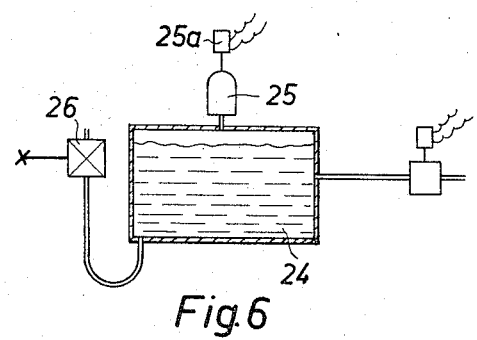
Inventor:
Georg Oberländer
By
Walter Becker.

United States Patent Office 3,368,082
Patented Feb. 6, 1968

3,368,082
INSTANTLY AVAILABLE RESERVE INSTALLATION FOR ELECTRIC NETWORKS
Georg Oberländer, Oberursel, Germany, assignor to Klockner-Humboldt-Deutz Aktiengesellschaft, Cologne, Germany
Continuation-in-part of application Ser. No. 386,860, Aug. 3, 1964. This application Jan. 25, 1967, Ser. No. 611,764
Claims priority, application Germany, Aug. 3, 1963, K 50,425
13 Claims. (Cl. 290—4)

ABSTRACT OF THE DISCLOSURE

The invention relates to a motor generator set having a standby prime mover for driving the generator in the event of power failure to the motor, and further including an instantly available energy source of limited capacity which goes into action instantaneously upon failure of the said power source and drives the generator during the time that the prime mover is coming up to speed and assuming the load, whereupon the instantly available energy source is interrupted and is restored to ready condition.

---

The present invention relates to an apparatus for an electric network, which in case of failure of the network voltage or an unduly strong drop in the voltage, will be able to feed the consumer from a unit comprising a prime mover and a current generator, and in which, when operating from a network while the prime mover is disengaged, the said current generator will be held at its speed of operation by a motor energized from the network and wherein an instantly available reserve power installation provides power to drive the generator after failure of the network and prior to full load operation of the prime mover.

This application is a continuation-in-part of my copending application, Ser. No. 386,860, filed Aug. 3, 1964.

With heretofore known apparatus, the current generator which was running during network operation and was driven by a prime mover during emergencies, was firmly connected to a flywheel the storage energy of which was sufficient during the interval during which the changeover from network operation to emergency operation was effected, to prevent an undesired strong drop in voltage and also in the frequency. In many instances, a portion of the energy stored in the flywheel was employed for starting the prime mover. This type of storing energy is acceptable with installations of relatively low output with a prime mover which has a low starting period and quickly reaches the stage where it furnishes its full output. The said type of storing energy is also acceptable if the requirements concerning voltage and frequency drop during the changeover from network operation to emergency operation, are not too high. The flywheels required for such arrangements can more or less, as far as weight and dimensions are concerned, be organically absorbed in the overall structure of the unit when disregarding the fact that such flywheels naturally bring about an increase in the weight and in the outer dimensions of the unit, which facts, however, make themselves felt in an undesired manner when portable or moveable units are involved. Moreover, such flywheels require particularly carefully produced bearings and, in view of the blower effect inherent thereto, continuously absorb considerable power. The employment of storage flywheels becomes problematic, particularly when prime movers are employed which require a relatively long starting time, as is the case, for instance, with large internal combustion piston engines and gas turbines, and/or if very low voltage and frequency variations are permissible for the time period of the changeover from network to emergency operation. In such instances in which the flywheels, with regard to weight and dimension, have no proportional ratio with regard to the other elements of the unit, and thus require an unduly great amount of power, there exists the justification to look for other possibilities of storing energy.

It is, therefore, an object of the present invention to provide an arrangement which, during failure of the network voltage or an unduly strong drop in the voltage, will furnish an immediately available reservoir of electric energy, which will overcome the above-mentioned drawbacks.

It is another object of this invention to provide an arrangement as set forth above, which will be suitable for low as well as high power requirements and will permit a current supply which is without interruption and contains only tolerable voltage and frequency variations.

These and other objects and advantages of the invention will appear more clearly from the following specification in connection with the accompanying drawings, in which.

FIGURES 4 to 6 respectively diagrammatically illustrate various possibilities of designing the storage container for use with a water turbine and the creation of pressure in such container.

An arrangement according to the present invention is characterized primarily in that the rotor of a liquid turbine, such as a water turbine, preferably designed for the same output as the prime mover of the unit, is fixedly coupled to the generator of the unit. The rotor of the water turbine rotates continuously. This water turbine will, in case of failure of the network voltage or, when said voltage drops unduly at a minimum of retardation, be acted upon by water which is already under pressure in a storage container, or will at the same time be subjected to pressure. The pressure in said storage container, and the amount of water in said reservoir are so selected that the water turbine, when changing over to an emergency operation, will be acted upon to such an extent that it will furnish its full output until the prime mover is able to furnish the total energy required. According to the arrangement of the present invention, and in order to prevent excessive voltage and frequency variations when changing over from network operation to emergency operation, the energy required is stored in such a manner that it can be used at considerably less energy loss than when employing storage flywheels. It will be appreciated that the wheel of the water turbine, which continuously rotates in air during network operation, as well as after the changeover to emergency operation, requires considerably less power than a storage flywheel or any other kind of a turbine wheel, such as a gas turbine wheel.

In conformity with the present invention, the water turbine may be so dimensioned that in addition to the output required by the consumer, it will also be able to furnish the power required for starting the prime mover when changing over to emergency operation.

Figure 1:
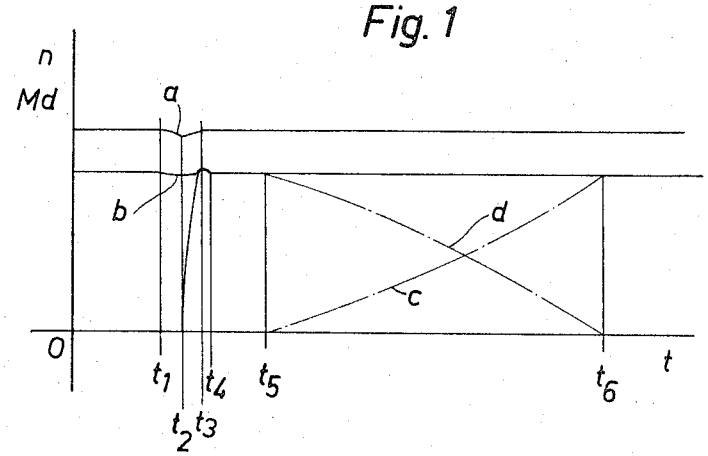
FIGURE 1 represents a graph illustrating the effect and operation of an arrangement according to the present invention.

The operation of an arrangement according to the present invention can best be understood from the graph illustrated in FIGURE 1. The plant or apparatus according to the present invention, as illustrated in the drawings, represents a no-break generating set with an immediately available reserve unit for a three-phase current network and comprises a current generator which continuously feeds into the consumer network and which, during network operation, is driven by a polyphase induction motor whereas, during emergency operation, said generator is driven by a two-shaft gas turbine through the intervention of an overrunning clutch.

Plotted on the ordinate of the graph is the speed $n$ of the current producer. The graph also has plotted on the ordinate the torque $Md$ to be introduced into the current generator and determined by the consumer, whereas the time is plotted on the abscissa.

Thus, the graph shows the course of said torque $Md$ and the speed of the current producer $n$ in conformity with the time. It may now be assumed that during network operation, the current supply to the polyphase induction motor driving the current generator is suddenly interrupted at the time $t_1$ so that the speed of the current producer drops. When this occurs, also the voltage in the consumer network drops. The energy absorbed by the consumers likewise drops so that in the end, also the torque required by the current generator drops. The energy stored in the rotor of the current generator and in the masses continuously rotating with said rotor prevents the voltage in the consumer network from dropping too fast. As soon as the voltage at the polyphase induction motor fails, the starting command is given for the actuation of the water turbine continuously rotating with the current generator, and also for the actuation of the two-shafts gas turbine. In view of the inertia of the control devices conveying the said command, the start proper of the two machines will be delayed up to the time $t_2$. From this time on, the water turbine is in a position to furnish a torque which latter at $t_3$, i.e. after a very short time period, will reach its full value. This full value must be somewhat higher than the torque withdrawn by the current generator under full load with network operation, because the energy which during the time period $t_2-t_1$ is withdrawn from the rotating masses, has to be returned to the system in order to obtain the normal speed of operation. Said speed as well as voltage, current and frequency in the consumer network have at the time period $t_3$ again reached their nominal values. The torque withdrawn from the water turbine drops up to time $t_4$ to the value which is required for the supply of the consumers. In order during the shift-over from network operation to emergency operation, to keep the voltage drop as small as possible as far as magnitude and duration are concerned, it is obviously advantageous to maintain the time period $t_2-t_1$ and $t_3-t_1$ as small as possible. The energy stored in the rotating masses will likewise affect the voltage drop. In other words, the greater the energy stored in said rotating masses, the flatter will be the course of lines $a$ and $b$ so that it might be advantageous, in conformity with a further development of the invention, to provide an additional mass which is rather small in comparison to the heretofore customary storage flywheels and which continuously rotates with the current generator.

At the time $t_2$, also the gas turbine starts the gas generator which comprises a compressor, a combustion chamber and a turbine driving said compressor. At the time $t_5$, said gas generator has accelerated the working turbine to such an extent that the latter rotates at the speed of the current generator. It rotates the current generator through the intervention of the coupling and furnishes power in conformity with the curve $c$. The control is so effected that the output of the water turbine decreases to the same extent in conformity with curve $d$. At the time $t_6$, the water turbine has been completely displaced by the gas turbine. A corresponding changeover procedure will, of course, take place with other prime movers, for instance internal combustion engines.

In conformity with the present invention, preferably automatically operated devices are provided for restoring the readiness of the supply source for the water turbine after the changeover to emergency operation has been completed. The emergency operation will advantageously be maintained until the readiness for normal operation has been completely restored.

The storing of energy for the water turbine may be effected in any suitable manner. Thus, for instance, the water reservoir, provided that local circumstances permit, may be designed as elevated container the drop conduit of which is controlled by a valve which advantageously is located directly ahead of the water turbine and quickly opens at the right time. When arranging the storage container at the level or approximately the level of the machine set, it is principally advisable to see to it that the inlet nozzle or nozzles of the water turbine and the water level in the container are located at the same or approximately the same height in order to obtain short accelerating paths for the water at the time when the water turbine is to be actuated. Various possibilities are available for subjecting the water to pressure. Thus, the storage container for the water turbine may be designed as closed, preferably entirely filled container and may through a conduit, connected to a bottom opening in the container or a lateral opening near the bottom of the said container, or through a conduit connected to an immersion tube, communicate with the turbine in a non-throttled manner. The storage container may furthermore communicate with a source of air or gas under pressure through a conduit connected to said container preferably above the water level and controlled by a valve which quickly opens when shifting over to emergency operation.

Another possibility consists in designing the storage container for the water turbine as air chamber. This air chamber will be filled by a high pressure water pump until the necessary pressure has been obtained and will act upon the water turbine through a conduit which is connected to an immersion tube or through a lateral opening near the bottom of the air chamber. Said last-mentioned conduit is controlled by a valve which opens quickly when changing over from network operation to emergency operation.

According to a further suggestion, the storage container may be designed completely closed and may be connected to the turbine through a conduit connected to an opening in the bottom of said container, or an opening near the bottom of said container, or through an immersion tube. When shifting from network operation to emergency operation, the necessary pressure upon the water in the container may be produced by firing a set of rockets in said container.

According to still another modification, the container may be designed in the form of a boiler connected to the turbine by a conduit which is controlled by a valve which opens quickly when shifting from network operation to emergency operation, said conduit may communicate with the container through an opening in the bottom hereof, or through a lateral opening in the container near said bottom, or through an immersion tube. The necessary pressure would in this instance be developed in the container in view of the steam which would be produced when heating the water.

Figure 2:
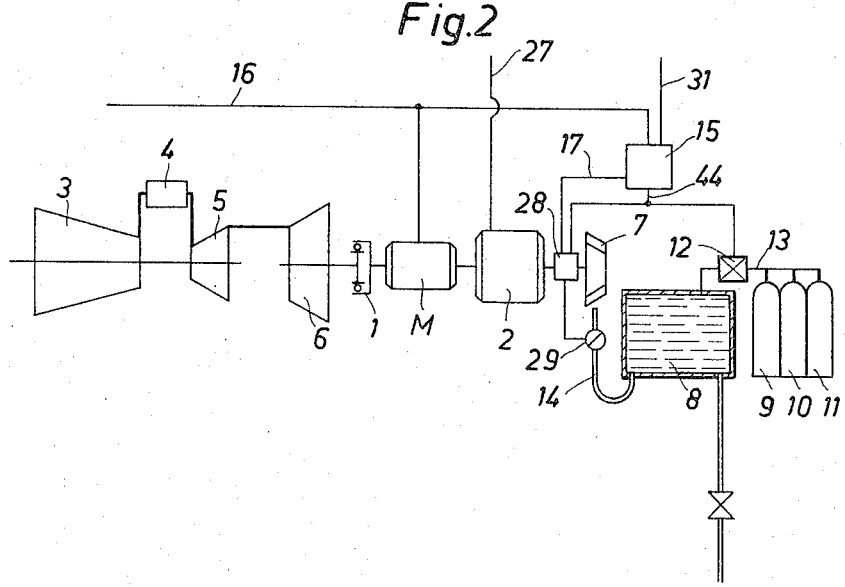
FIGURE 2 is a diagrammatic representation of the build-up of an arrangement according to the present invention representing a no-break generating set of high output with a two-shaft gas turbine employed as prime mover for the current generator.

An installation according to the present invention is illustrated for instance in FIGURE 2, and comprises a two-shaft gas turbine which following the failure of the network voltage will through the intervention of an overriding clutch 1 or any other shiftable clutch or standard type drive a current generator 2 which also during network operation rotates continuously at its normal speed of rotation. The gas turbine comprises a gas producer and a working turbine, said gas producer including a compressor 3, a combustion chamber 4 and a turbine 5 driving said compressor 3. The working turbine is designated 6 and is connected to receive the gases from chamber 4 after the gases have passed through turbine 5. The shaft of turbine 6 is separate from the shaft of turbine 5 which only drives compressor 3. Fixedly coupled to the current generator 2 is a water turbine 7 which is actuated by water from a water storage container 8 when the network voltage fails. The pressure required for feeding the water is obtained by means of gas under pressure which only at a required time will flow from the reservoirs 9, 10 and 11 through a conduit 13 and valve 12 therein into the water storage container 8. Conduit 14 leading from container 8 to the water turbine 7 is connected to the bottom of container 8. Furhermore, container 8 is so arranged that the nozzle of the water turbine 7 and the level in the container 8 are at the same height so that the accelerating path or stroke from the water displaced from container 8 in case of failure of the network voltage will be very short. The water reserve, as well as the pressure and the compressed air reserve in containers 9, 10 and 11, are so selected that when shifting over from network operation to emergency operation, the water turbine 7 will immediately be acted upon to its full extent and will have a sufficient output until the working turbine 6, which after reaching the speed of current generator 2 and water turbine 7 begins to furnish its output to the current generator 2, will be able to furnish the entire power requied by the current generator 2. The arrangement furthermore comprises a control device 15 for controlling the actuation of the water turbine 7. The respective condition at which the emergency system commences operation is conveyed to the control device 15 through the intervention of a conduit 16.

Control valve 29 in conduit 14 is under the control of governor 28 to hold the generator at a constant speed. The governor 28 is under the control of control device 15 in a conduit 17.

In operation, it is understood that the consumers connected to line 27 are fed exclusively by generator 2, not only when the operation is from the network 16, but also when employing the gas turbine set 3, 4, 5 and 6.

During network operation, the gas turbine set is at a standstill, and the current generator 2, together with the running wheel fixedly coupled to generator 2 and pertaining to the water turbine 7, is driven by the electric motor M.

When the network voltage fails, the water turbine is immediately acted upon, and simultaneously the gas turbine set 3, 4, 5, 6 is started. As soon as the working turbine 6 has come up to about the speed of the water turbine 7 there is provided a control device 15 which is connected to the network line 16 in a parallel arrangement to the electric motor M.

Figure 3:
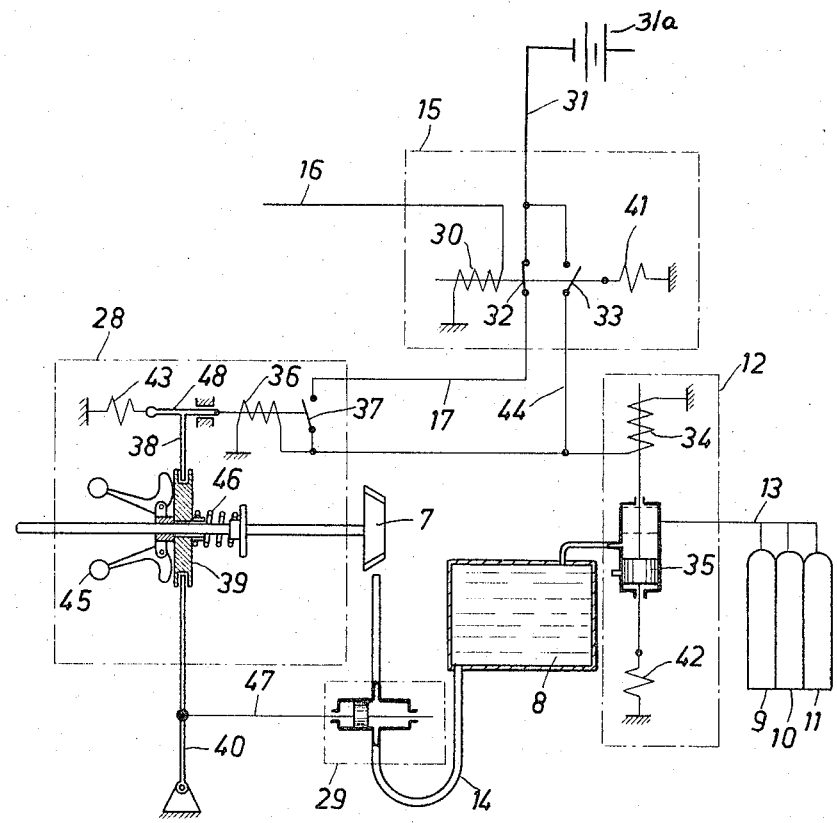
FIGURE 3 shows parts of FIGURE 2 in more detail.

The operation of control device 15 will be evident from FIGURE 3. Control device 15 comprises a relay, the energizing coil 30 of which is continuously connected to the network line 16 while its armature acts upon a switch having blades 32, 33 against the thrust of spring 41. Switch blades 32, 33 are adapted to establish electric communication of a feeding line 31 of a control voltage source such as battery 31a with line 17 when coil 30 has no voltage, and is furthermore adapted to establish communication between feeding line 31 and line 44 when coil 30 is under voltage. Both lines 17 and 44 lead to governor 28 of the water turbine 7 or to a branch of line 44, and furthermore to the control device 12 arranged in gas conduit 13 which connects the compressed air containers 9, 10, 11 with the water container 8. This control device 12 comprises a lifting magnet with a coil 34 the armature of which is adapted against the thrust of a spring 42 to act upon a valve member 35 which, when coil 34 has no voltage (solid line position), frees the flow of compressed air to container 8 while, when coil 34 is under voltage, valve member 35 will move to its dash line position whereby the compressed air flow to the water container 8 is blocked.

The water turbine 7 is, in a customary manner, equipped with the governor 28 which, during the actuation of the turbine 7, operates so that a speed is maintained which, in the present instance, is slightly below the speed of operation of the working turbine 6. Governor 28 primarily comprises two flyweights 45 mounted on the shaft of turbine 7, said flyweights rotating during network operation as well as also during reserve operation and acting against the spring 46 upon a likewise rotating sleeve 39. Sleeve 39 has the form of a disc with a circumferential groove engaged by the free end of an oscillating lever 40 linked to a bar 47 which, in its turn, operates upon control valve 29 in the feeding line 14 of turbine 7.

The operation is as follows: As soon as the weights 45, due to increasing speed, move away from each other, sleeve 39 is advanced in the direction toward the turbine 7 and takes along the control slide 29 so as to increase the throttling of the water supply to turbine 7. In the circumferential groove of sleeve 39 there is additionally guided a finger 38 firmly connected to armature 48 of a relay, which armature is displaceable parallel to the axis of turbine 7. The energizing coil 38 of said relay is connected to the output line 44 of the control device 15. A switch 37, actuated by armature 48 will, while the energizing coil 36 is under voltage, connect line 44 of the control device 15 with line 17 and hold the governor in an idle position with valve 29 closed. During network operation, the gas turbine is at a standstill and the electric motor M drives the generator 2 and the running wheel of the water turbine 7. Relay coil 30 in control device 15 is under voltage and maintains the switch blade 33 against the tension spring 41 in closed condition while switch blade 32 is open. Thus coil 34 of control device 12, as well as relay coil 36 of water turbine governor 28, are under voltage from line 31.

Slide or valve 35 in the control device 12 block the connection between compressed air containers 9, 10 and 11 on one hand, and water container 8 on the other hand, and holds armature 48 and thus sleeve 39 and valve members 29 displaced toward the right against the thrust of spring 46, in a position in which the control valve 29 keeps the conduit 14 blocked. Switch 37 also is closed. In case of failure of the network voltage, switch blade 33 opens under the influence of spring 41, whereas switch blade 32 closes. Coil 34 in the control device will thus be without voltage so that the control valve 35 under the influence of spring 42 and under the influence of its weight moves into open position in which it frees the path for the compressed air to the water container 8.

In the meantime, due to the loss of voltage at relay coil 36, sleeve 39 of the governor of the water turbine 7 is freed which means that the sleeve instantaneously moves toward the left into its working position and through the control valve 29 frees the admission of water from container 8 to turbine 7. Thus the turbine 7 is actuated upon and drives the generator 2 until it is replaced by the gas turbine which is started immediately after failure of the voltage in the network 16. Toward the end of this substituting step, and due to the fact that the gas turbine speed is higher than the speed of the water turbine 7 during the transition period, the weights 45 move more and more away from each other and displace the sleeve with the armature 48 and valve 29 more toward the right until finally valve 29 blocks the water supply, and switch 37 is closed. This last-mentioned fact brings about that the relay coil 36 and coil 34 in the control device 12 are again under voltage from line 31. The control sleeve 39 then moves entirely toward the right and the control valve 35 and control device 12 moves into its closing position. When the voltage returns in the network 16 coil 30 in control device 15 is again under voltage with the result that switch blade 33 closes and switch blade 32 opens. This does not change the above-mentioned condition of valves 29 and 35. Electric motor M merely takes over the drive, and the gas turbine is stopped. The above-mentioned starting condition during network operation has again been restored. As soon as sufficient compressed air and water are available, the arrangement is ready for the next shift over to reserve operation in case of network failure.

FIGURE 4 illustrates an arrangement according to which the water reservoir for the water turbine 20 is designed as a closed chamber 18. The water reservoir is fed by a high pressure water pump 19. Valve VI controls the rate of delivery of water to the turbine 20. An auxiliary reservoir 18a is adapted to feed via a valve V2 to the turbine. Reservoir 18a is continuously under pressure and can supply turbine 20 during the brief interval that is required to bring pump 19 up to speed. Reservoir 18a could be pressurized by a gas bottle or might be elevated to produce the required pressure, or both. Reservoir 18a or reservoir 18 could be used alone, or they could be used together so that reservoir 18a could be effectual while pump 19 came up to speed.

FIGURE 5 shows a further modification of the invention in which a continuously heated water reservoir 21 is designed to have an upper chamber. The heating up of the water up to the production of steam is carried out to such an extent that after opening control valve 23 for actuation of water turbine 22, sufficient steam pressure will prevail in said container. Burner control means 23a is sensitive to pressure in reservoir 21. Valve 23 in FIGURE 5 functions as both an on-off valve and as a flow rate control valve.

Valve 23 and control means 23a are so controlled that following an emergency operation, the reservoir will quickly be refilled.

According to the modification of FIGURE 6, the reservoir is designed as a closed reservoir 24 which has connected thereto a shell 25 which when opening valve 26 in the actuating line leading to the water turbine, a set of rockets is fired. In view of the thus developed pressure in the container, the water will flow to the turbine. Control means 25a for firing the rockets is actuated in the same manner as valve 12 in FIGURE 2, whereas valve 26 is the flow rate control valve and corresponds to valve 29 in FIGURE 2.

It is advisable in connection with the arrangement according to the present invention immediately after the shiftover to emergency operation, to start the restoration of the emergency system for the actuation of the water turbine during the shiftover from network operation to emergency operation.

It will be understood that this invention is susceptible to modification in order to adapt it to different usages and conditions and, accordingly, it is desired to comprehend such modifications within this invention as may fall within the scope of the appended claims.

What is claimed is:
1. In combination; a generator, an electric motor drivingly connected to the generator, a power line to supply energy to said motor, a standby prime mover for driving said generator having speed and power characteristics in conformity with the capacity of the generator and connected thereto via one-way clutch means which will permit rotation of the generator independently of the prime mover during normal generator operation, a liquid turbine rotor fixedly drivingly coupled to said generator, a container of liquid for the turbine rotor, means for developing pressure on the liquid in the container, and control means operable in response to a drop in the voltage supply to said motor for substantially instantaneously releasing liquid at a controlled rate from said container to said turbine rotor for driving said generator for an emergency period of time during which said prime mover is brought up to speed and commences to drive said generator via said clutch means.

2. The combination according to claim 1 in which said turbine rotor has speed characteristics and a power output capacity on the same order as that of said prime mover.

3. The combination according to claim 2 in which said container is of limited capacity so as to provide for operation of said turbine rotor for a period of time not substantially greater than the period of time required to put said prime mover into operation.

4. The combination according to claim 3 which includes means for refilling said container following initiation of operation of said prime mover.

5. The combination according to claim 3 in which said control means includes a valve operable for controlling the rate of liquid supply to said turbine rotor.

6. The combination according to claim 5 in which a conduit leads from said container to nozzle means adjacent said turbine rotor and the level of the liquid in the reservoir when filled is substantially the same as the level of said nozzle means.

7. The combination according to claim 6 which includes a source of gas under pressure connected to the reservoir near the top thereof for supplying actuating pressure to the liquid in the reservoir, said control means including a valve between said source of gas and said reservoir.

8. The combination according to claim 6 which includes a high pressure pump connected to the reservoir to develop actuating pressure on the water therein.

9. The combination according to claim 6 which includes rocket means communicating with said reservoir at the top and said control means includes means for firing the rocket means to develop pressure on the liquid in the reservoir.

10. The combination according to claim 6 in which means are provided for heating the liquid in the reservoir to develop pressure thereon.

11. In combination; a consumer's electric supply line, a generator feeding said line, an electric supply network, a motor drivingly connected to said generator and connected to receive power from said network so as to drive the generator at rated speed while said network is in operation, a liquid turbine rotor connected to said generator, a prime mover for driving said generator, a one-way clutch connecting said prime mover with said generator so the motor can drive the generator while the prime mover is idle, a source of liquid under pressure, first means responsive to loss of voltage in said network for initiating an immediate supply of liquid from said source to said turbine rotor to commence driving of the generator by said rotor, and second means responsive to the prime mover reaching the speed of the generator for interrupting the supply of liquid from said source to said rotor.

12. The combination according to claim 11 in which said second means includes means for gradually reducing the supply of liquid from said source to said turbine rotor to permit gradual transfer of the load of the generator from said liquid turbine to said prime mover.

13. The combination according to claim 12 in which said source of liquid is a container of liquid and third means is provided under the control of said prime mover operable when the prime mover has assumed the full load of driving the generator to supply liquid to said container to replace the liquid used therefrom to drive said turbine rotor.

References Cited
UNITED STATES PATENTS

| | | | |
|---|---|---|---|
| 2,014,101 | 9/1935 | Bryan | 290—30 X |
| 2,920,211 | 1/1960 | Gotoh | 290—4 X |
| 2,972,056 | 2/1961 | Park et al. | 290—4 X |
| 3,050,635 | 8/1962 | Tanner | 290—4 |

ORIS L. RADER, *Primary Examiner.*

G. SIMMONS, *Assistant Examiner.*